United States Patent

Nihei et al.

[11] Patent Number: 6,016,243
[45] Date of Patent: Jan. 18, 2000

[54] MAGNETIC HEAD HAVING RECORDING MEDIUM FACING SURFACES WITH TILTED CRYSTAL ORIENTATION OF SINGLE CRYSTAL FERRITE

[75] Inventors: Yukari Nihei; Toru Matsunaga; Takashi Tamura, all of Miyagi, Japan

[73] Assignee: Sony Corporation, Tokyo, Japan

[21] Appl. No.: 08/896,438

[22] Filed: Jul. 18, 1997

[30] Foreign Application Priority Data

Jul. 18, 1996 [JP] Japan ................................. 8-189457

[51] Int. Cl.[7] ......................................................... G11B 5/127
[52] U.S. Cl. ............................................ 360/127; 360/122
[58] Field of Search ................................... 360/119, 122, 360/125, 126, 127

[56] References Cited

U.S. PATENT DOCUMENTS

| | | | |
|---|---|---|---|
| 5,057,955 | 10/1991 | Inagoya et al. | 360/125 |
| 5,202,806 | 4/1993 | Kawase | 360/120 |
| 5,515,222 | 5/1996 | Kumagai et al. | 360/127 |
| 5,576,912 | 11/1996 | Mitsumata et al. | 360/103 |

FOREIGN PATENT DOCUMENTS

| | | |
|---|---|---|
| 6-314408 | 11/1994 | Japan . |
| 7-021513 | 1/1995 | Japan . |
| 7-073408 | 3/1995 | Japan . |
| 8-315312 | 11/1996 | Japan . |

*Primary Examiner*—Jefferson Evans
*Attorney, Agent, or Firm*—Hill & Simpson

[57] ABSTRACT

A magnetic head is provided which realizes long service life and high reliability by improved abrasion resistance without deteriorating output characteristics of the magnetic head during recording/reproduction. In a magnetic head having a pair of magnetic cores which are joined together to form a unified magnetic core and between abutment surfaces of which is formed a magnetic gap, a pair of magnetic cores are each formed by a single-crystal ferrite having a surface perpendicular to the abutment surfaces formed by the (100) plane. One of the magnetic cores is arranged so that an angle θ between the <100>crystal orientation in a surface perpendicular to the abutment surfaces and the abutment surfaces is in a range of 0°≧θ≧26°, while the other magnetic core is arranged so that an angle θ between the <100> crystal orientation in a surface perpendicular to the abutment surfaces and the abutment surfaces is in a range or 154°≧θ≧180°.

7 Claims, 4 Drawing Sheets

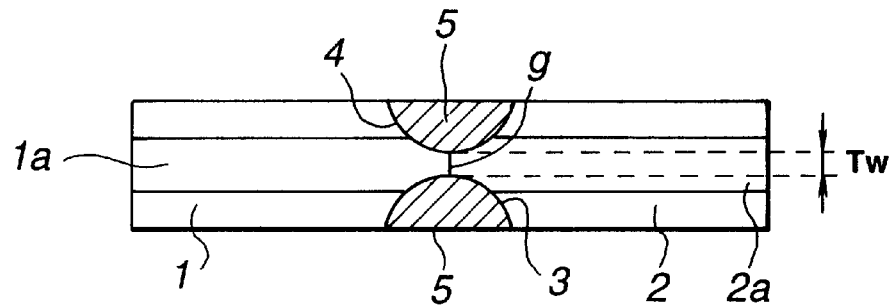
FIG.3
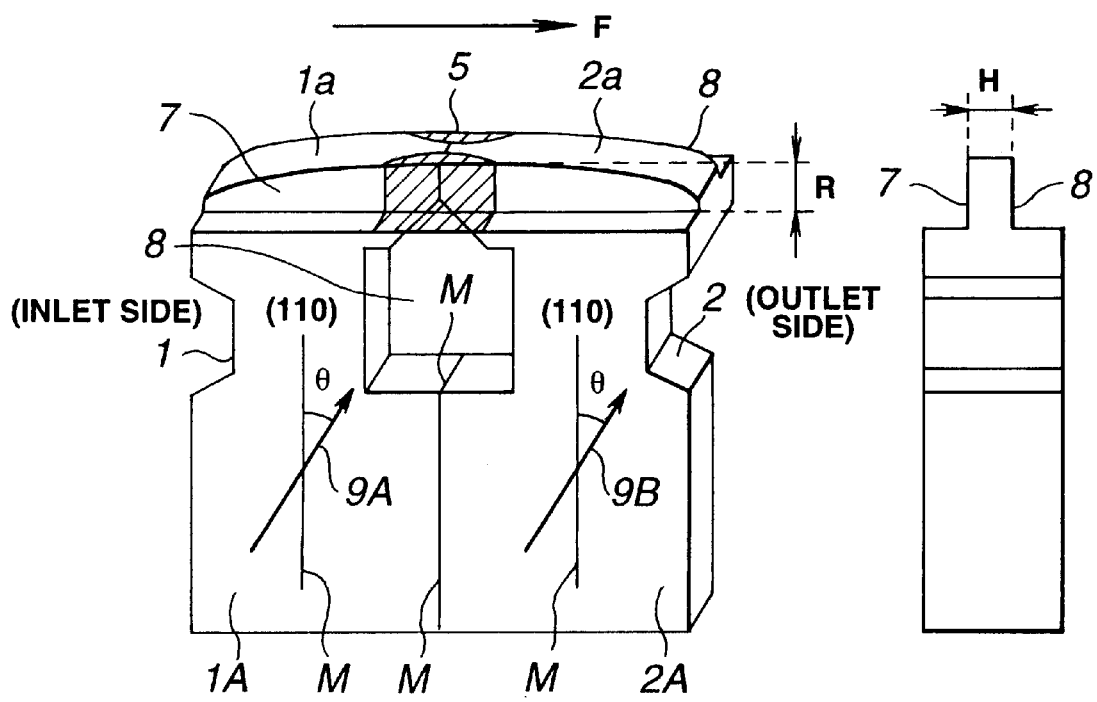
FIG.4A        FIG.4B

MAGNETIC HEAD HAVING RECORDING MEDIUM FACING SURFACES WITH TILTED CRYSTAL ORIENTATION OF SINGLE CRYSTAL FERRITE

BACKGROUND OF THE INVENTION

1. Field of the Invention

This invention relates to a magnetic head used in a magnetic recording/reproducing apparatus, such as a video tape recorder (VTR). More particularly, it relates to a magnetic head exhibiting abrasion characteristics equivalent to or higher than those in case of the crystal plane orientation of the β-format, while making the best use of high output characteristics proper to the crystal plane orientation of the VHS format.

2. Description of the Related Art

Recently, technical innovation in the field of VTR in reducing its size and weight and in improving its recording density is outstanding, and attempts are made towards further increasing the recording density. These attempts may be typified by, for example, introduction of a double azimuth head and recording/reproduction by digital signals. For realizing these functions, circuit designing employing carrier signals of a frequency not less than 10 MHz is used for further narrowing the track width or the gap length of the magnetic head.

For assuring a playback output despite the tendency towards short wavelength and narrow track width, it is necessary to increase the relative velocity between the recording medium and the magnetic head further.

Thus, the magnetic head material is required to have superior abrasion resistance and high machining accuracy, such that single crystal ferrite or a crystalline guard material is widely employed.

In particular, in the case of the magnetic head formed of a single crystal ferrite material, crystal orientation of the single-crystal material is controlled for improving output characteristics and abrasion resistance. The reason is that, in the single crystal ferrite, magnetic anisotropy persists, such that the direction of easy magnetization or the direction of magnetic flux is varied appreciably with the crystal orientation, thus significantly influencing output characteristics of the single crystal ferrite magnetic head during recording/reproduction. On the other hand, the abrasion resistance of the single crystal ferrite depends appreciably on the crystal plane of the sliding surface of the recording medium and on the relation between the sliding direction of the recording medium and the crystal orientation.

For example, in the case of a single-crystal ferrite magnetic head for recording/reproduction by the VHS format, a crystal plane orientation, known as the J-type, in which the (211) plane, (111) plane or its vicinity and the (101) plane or its vicinity are arrayed for the sliding surface with the recording medium, the gap abutment surface and the plane perpendicular to the gap abutment surface, is extensively employed.

However, although the electro-magnetic conversion characteristics proper to the magnetic head in the case of the J-type crystal plane orientation are better than those of the β-type crystal plane orientation, the sliding surface is inferior in abrasion resistance to those for the other crystal planes and, in addition, partial abrasion or the deviation in the top position of the sliding surface against the magnetic recording medium, referred to herein as R-top deviation, tends to be produced because of the tendency to differential abrasion by the sliding direction, as shown in FIGS. 1 and 2.

In the case of the VHS format, stringent demands have not been raised in connection with abrasion characteristics, as compared to the standards for Hi 8 magnetic material or β formats, because of the broader abutment width of the magnetic tape and the lower relative velocity between the magnetic tape and the magnetic head. However, if the abutment width of the sliding surface against the recording medium or the depth length of the magnetic gap is diminished, as in Hi-8 format, or if the relative velocity between the recording medium and the magnetic head is extremely high, as n the case of the digital VTR, there is a risk that the abrasion leads to deteriorated durability or reliability of the magnetic head.

SUMMARY OF THE INVENTION

It is therefore an object of the present invention to provide a magnetic head in which high durability and reliability may be realized by improving abrasion resistance without deteriorating the output characteristics during recording/reproduction of the magnetic head.

The present invention provides a magnetic head having a pair of magnetic cores which are joined together to form a unified magnetic core and between abutment surfaces of which is formed a magnetic gap, wherein each of the paired magnetic cores has at least a portion thereof lying towards a sliding surface for a magnetic recording medium formed of single-crystal ferrite, and wherein a main magnetic path forming surface of the single-crystal ferrite perpendicular to the abutment surfaces is constituted by a (110) plane, with the <100> crystal orientation in the main magnetic path forming surface being tilted at an angle of 26° or less relative to the direction of the magnetic gap depth. This arrays the crystal plane having excellent abrasion resistance on a sliding surface for a magnetic recording medium for improving abrasion resistance and assuring long service life.

By setting the values of the angle θ in the magnetic cores to appropriate values for reducing the difference in the amount of abrasion of the inlet side magnetic core of the head chip and that of the outlet side magnetic core thereof, in order to take into account the difference in the amounts of abrasion in the magnetic cores caused by the sliding of the recording medium, it becomes possible to prevent R-top deviation.

The present invention is applicable to a so-called junction ferrite magnetic head in which a single crystal ferrite is provided towards the sliding surface of the magnetic core for the magnetic recording medium and polycrystal ferrite is provided in the remaining portions of the magnetic core.

Since the crystal plane superior in abrasion resistance is arranged towards the sliding surface for the recording medium, the magnetic head of the present invention is improved in abrasion resistance and durability.

Since the values of the angle θ in the magnetic cores are set to pre-set values for reducing the difference in the amount of abrasion of the inlet side magnetic core of the head chip and that of the outlet side magnetic core in order to take into account the difference in the amounts of abrasion in the magnetic cores caused by the sliding direction of the recording medium, it becomes possible to prevent R-top deviation.

The result is that it becomes possible to realize abrasion characteristics equivalent or even superior to those for the crystal plane orientation of the β-format while making the best use of the high output characteristics proper to the crystal plane orientation of the VHS format.

BRIEF DESCRIPTION OF THE DRAWINGS

FIG. 3 is a plan view showing a magnetic head embodying the present invention.

FIGS. 4A and 4B show the structure of the magnetic head of FIG. 3, wherein FIG. 4A is a schematic perspective view thereof and FIG. 4B is a side view thereof.

DESCRIPTION OF THE PREFERRED EMBODIMENTS

Figure 1:
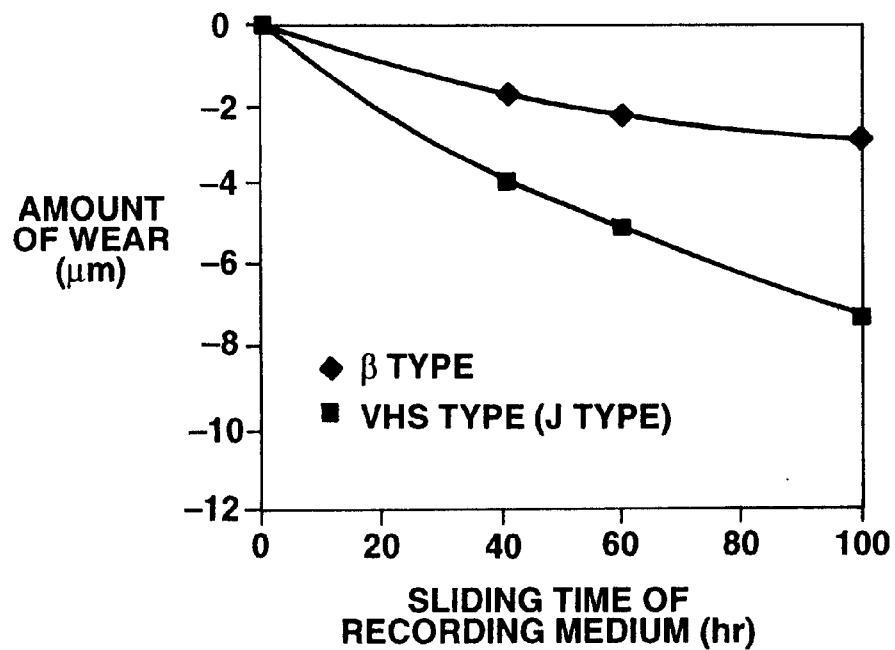
FIG. 1 shows the relation between the crystal plane orientation of a single crystal of ferrite and magnetic head characteristics and in particular the difference of the amount of abrasion of the magnetic head relative to the time of sliding of the recording medium between the J-type and the β-type.

Referring to the drawings, preferred embodiments of the present invention will be explained in detail.

A magnetic head of the instant embodiment has a pair of magnetic cores 1, 2 constituting a closed magnetic path, as shown in FIGS. 3, 4A and 4B. These magnetic cores 1, 2 are unified together by fusion glass 5 and a magnetic gap g functioning as a recording/reproducing gap is formed between abutment surfaces M. In the following explanation, it is assumed that the magnetic cores 1, 2 are present on the inlet and outlet sides relative to the running direction F of the magnetic recording medium, respectively.

The magnetic gap g of the magnetic head has a track width Tw controlled by track width regulating grooves 3, 4 formed arcuately on the abutment surfaces M of the magnetic cores 1, 2. The magnetic gap g has its depth regulated by a winding window 6 used for winding a coil. Also the magnetic head has steps 7, 8 for regulating the abutment width in sliding surfaces 1a, 2a for the magnetic recording medium on which faces the magnetic gap g for assuring abutment characteristics relative to the magnetic recording medium.

The paired magnetic cores 1, 2 are formed of single crystal ferrite and have surfaces 1A, 2A substantially perpendicular to the abutment surfaces M of the magnetic cores 1, 2, that is so-called main magnetic path forming surfaces, as (110) planes. If the magnetic head is devoid of an azimuth angle, with the abutment surfaces M and the lateral sides of the magnetic cores 1, 2 running perpendicular to each other, these planes 1A and 2A correspond to the lateral sides of the magnetic cores 1, 2. If the magnetic head has the azimuth angle, with the abutment surfaces M and the lateral sides of the magnetic cores 1, 2 not running perpendicular to each other, the planes 1A, 2A correspond to planes deviated from the lateral sides of the magnetic cores 1, 2 by the azimuth angle.

With the magnetic head of the present embodiment, the magnetic core 1 has its crystal planes arrayed so that an angle θ between the direction of the magnetic gap depth that is the abutment surfaces M of the magnetic cores 1, 2 and the <100> crystal orientation 9A in the plane 1A substantially perpendicular to the abutment surfaces M will be not more than 26° (0°≧θ≧26°). On the other hand, the opposite side magnetic core 2 has its crystal planes arrayed so that an angle θ between the abutment surfaces M of the magnetic cores 1, 2 and the <100> crystal orientation 9B in the plane 2A substantially perpendicular to the abutment surfaces M will be not more than 26° in the opposite direction (154°≧θ≧180°).

With the above-described structure, the crystal plane (100) having superior abrasion resistance can be used as a sliding surface for the magnetic recording medium, while the angle θ can be set for reducing the difference between the amount of abrasion of the magnetic core 1 on the inlet side and the magnetic core 2 on the outlet side relative to the running direction F of the magnetic recording medium, thus improving abrasion resistance while reducing the R-top deviation.

If the magnetic core 2 on the outlet side undergoes more abrasion than that on the inlet side magnetic core 1, the angle θ of the outlet side magnetic core 2 is changed in the above range in order to make the outlet side magnetic core 2 less susceptible to abrasion than the inlet side magnetic core 1. Alternatively, the angle θ of the inlet side magnetic core 1 is changed within the above range in order to make the inlet side magnetic core 1 more susceptible to abrasion than the outlet side magnetic core 2. This enables the R-top deviation to be reduced.

Although the magnetic cores 1, 2 in the present embodiment are formed only of single crystal ferrite, the present invention is applicable to a junction ferrite magnetic head comprised of a single crystal ferrite and a polycrystal ferrite bonded together. Specifically, a single crystal ferrite may for example be arranged on the sliding surface for the magnetic recording medium, with the polycrystal ferrite being arranged on other portions for constituting the magnetic core. In this case, the definition of the crystal planes and the crystal orientation in the present invention is applicable to the single crystal ferrite portion.

The present invention is also applicable to a so-called metal-in-gap type magnetic head in which a magnetic metal film is arranged in the vicinity of the magnetic gap g or to a so-called tilted sendust sputter type magnetic head in which a pair of magnetic core halves, each having a magnetic metal film formed on a surface of one of paired substrates, are bonded together with the metal films abutted against each other, and in which the magnetic gap surface has a pre-set angle with respect to a boundary surface between the substrate and the magnetic metal film.

EXAMPLE

In the present Example, plural test heads (dummy heads) not having a magnetic gap g and being of the same material and shape were prepared and the amount of abrasion produced on sliding the recording medium was checked.

Specifically, plural test heads were prepared with various values of the angle θ between the <100> crystal orientations 9A, 9B in the plane substantially perpendicular to the abutment surfaces M of the magnetic cores 1, 2 and the plane corresponding to the abutment surfaces M of the magnetic gap g, and measurement was made of the amount of abrasion caused to the sliding surface when the recording medium was slid for a pre-set time in a pre-set direction (forward direction). Similarly, the running direction F of the recording medium was reversed for the test heads and measurement was made of the amount of abrasion caused to the sliding surface when the recording medium was slid for a pre-set time in the above-mentioned direction (reverse direction). The results are shown in FIG. 5.

Figure 2:
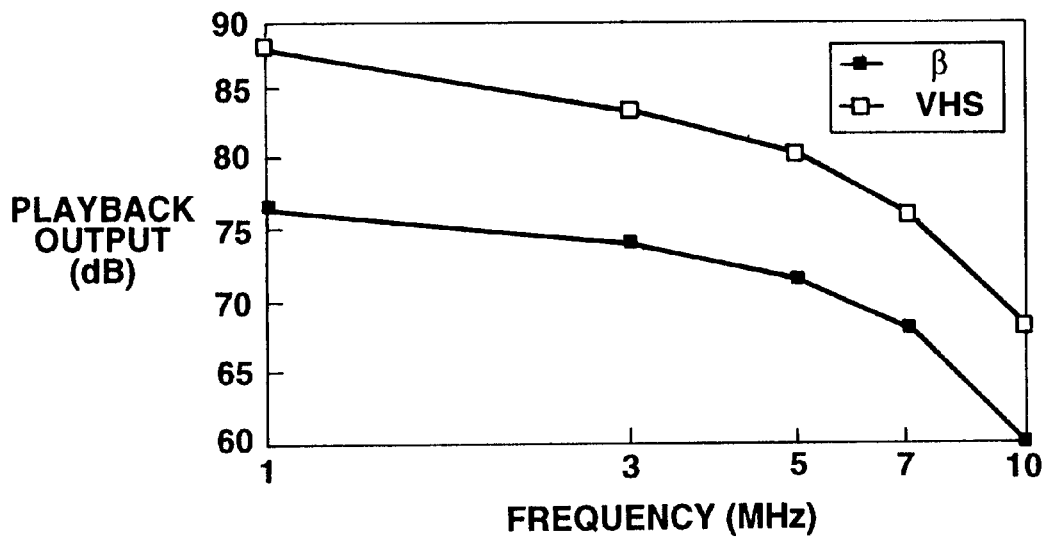
FIG. 2 shows the relation between the crystal plane orientation of a single crystal of ferrite and magnetic head characteristics and in particular the difference between recording/reproducing characteristics for the crystal plane orientation of the VHS format and those for the crystal plane orientation of the β format.

Meanwhile, in the above measurement, coated type magnetic tapes were used, and a relative velocity between the magnetic tape and the magnetic head was set to 20 m/s. The abutment width H of the sliding surfaces 1a, 1b of the recording medium was set to 100±10 μm (see FIG. 2b) while the height R of the distal end of the head chip was set to 8 mm (see FIG. 2a).

Figure 5:
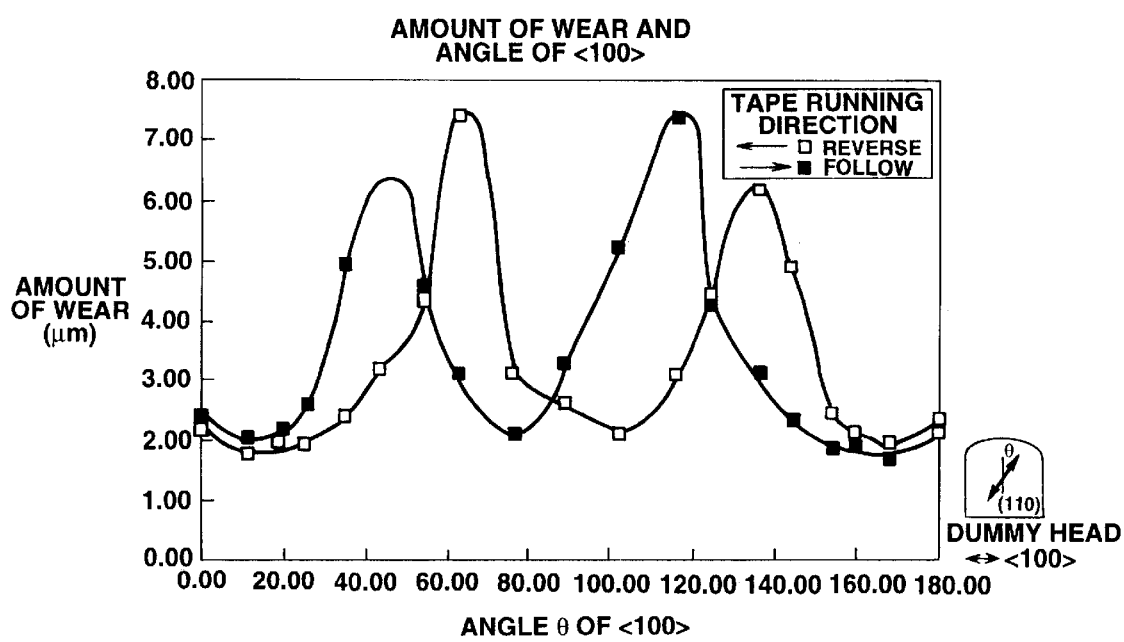
FIG. 5 is a graph sowing the amount of abrasion of the magnetic head in case the recording medium is run for a pre-set time for variable angle θ between the <100> crystal orientation and the abutting surface, with the magnetic head being a test head (dummy head) not having a magnetic gap nor the winding window.

As may be seen from FIG. 5, the amount of abrasion is decreased if the crystal planes are set so that the angle θ is such that 0°≧θ≧180° or 154°≧θ≧180°, with the amount of abrasion being then not more than approximately 3.0 μm equivalent to that with the crystal plane orientation (θ=90°) for the β-type.

The amount of abrasion for the same angle θ differs depending on the tape running direction. This difference is noticed for respective angles. However, for the angle θ in a range of 0°≧θ≧28° or 154°≧θ≧180°, the difference in the amount of abrasion becomes smaller.

Then, plural magnetic heads were produced, using the plane substantially perpendicular to the abutment surfaces of the paired magnetic cores as (110) planes, and using various values of the angle θ between the plane 9A of the magnetic core 1 on the inlet side of the magnetic tape and the abutment surfaces M of the paired magnetic cores, shown in Tables 1 and 2 below as 'H core θ, and also various values of the angle θ between the plane 9B of the magnetic core 1 on the outlet side of the magnetic tape and the abutment surfaces M of the paired magnetic cores, shown in Tables 1 and 2 below as 'W core θ.

For each magnetic head, the R-top deviation and the amount of abrasion of the magnetic head in case the recording medium was run for a pre-set time were checked. The results are shown in Tables 1 and 2, in which the results for a Comparative Example are also shown. Meanwhile, the amount of abrasion of the crystal plane orientation for the β-type and the amount of R-top deviation are shown as Comparative Example 1.

TABLE 1

| samples | W core θ | H core θ | R-top deviation (μm) | direction of deviation | amount of abrasion (μm) | notes |
|---|---|---|---|---|---|---|
| Comp. Ex.1 | 90 | 90 | <50 | in both directions | 3.0 | β orientation |
| Ex.1 | 0 | 0 | <30 | in both directions | 2.3 | |
| Ex.2 | 25.2 | 25.2 | <50 | both directions | 3.4 | |
| Ex.3 | 154.8 | 154.8 | <50 | in both directions | 2.0 | |
| Ex.4 | 154.8 | 25.2 | <100 | towards W core | 2.8 | |
| Ex.5 | 25.2 | 154.8 | <100 | towards H core | 3.0 | |
| Ex.6 | 19.5 | 19.5 | <30 | in both directions | 2.2 | |
| Ex.7 | 160.5 | 160.5 | <30 | in both | 2.1 | |

TABLE 1-continued

| samples | W core θ | H core θ | R-top deviation (μm) | direction of deviation | amount of abrasion (μm) | notes |
|---|---|---|---|---|---|---|
| | | | | directions | | |
| Ex.8 | 160.5 | 19.5 | <50 | towards W core | 2.2 | |
| Ex.9 | 19.5 | 160.5 | <50 | towards H core | 2.2 | |
| Ex.10 | 11.4 | 11.4 | <30 | in both directions | 1.9 | |
| Ex.11 | 168.6 | 168.6 | <30 | in both directions | 2.1 | |
| Ex.12 | 168.6 | 11.4 | <50 | towards W core | 1.9 | |
| Ex.13 | 11.4 | 168.6 | <30 | towards H core | 2.0 | |
| Ex.14 | 11.4 | 25.2 | <100 | towards H core | 3.1 | |
| Ex.15 | 168.6 | 154.8 | <50 | towards H core | 2.1 | |

TABLE 2

| samples | W core θ | H core θ | R-top deviation (μm) | direction of deviation | amount of abrasion (μm) | note |
|---|---|---|---|---|---|---|
| Comp. Ex.2 | 144.7 | 144.7 | <50 | in both directions | 3.8 | objectionable in slide noise |
| Comp. Ex.3 | 144.7 | 35.3 | <180 | towards W core | 4.5 | VHS orientation |
| Comp. Ex.4 | 35.3 | 144.7 | <200 | towards H core | 4.1 | |
| Comp. Ex.5 | 35.3 | 35.3 | <50 | in both directions | 5.0 | |
| Comp. Ex. 6 | 43.3 | 136.7 | <230 | towards H core | 5.2 | |
| Comp. Ex.7 | 43.3 | 43.3 | <100 | in both directions | 6.3 | |
| Comp. Ex.8 | 54.7 | 125.3 | <100 | in both directions | 4.5 | |
| Comp. Ex.9 | 54.7 | 54.7 | <100 | in both directions | 4.6 | |
| Comp. Ex. 10 | 116.6 | 116.6 | <100 | in both directions | 7.4 | |
| Comp. Ex.11 | 63.4 | 116.6 | <300 | towards W core | 5.8 | |
| Comp. Ex.12 | 63.4 | 63.4 | <100 | in both directions | 4.3 | |
| Comp. Ex.13 | 77.1 | 102.9 | <100 | towards W core | 2.8 | small output |
| Comp. Ex.14 | 77.1 | 77.1 | <50 | in both directions | 2.2 | small output |

For the above measurements, a coated type magnetic tape was used, and the relative velocity between the magnetic tape and the magnetic head was set to 20 m/s. The abutment widths 1a, 2a of the sliding surface with the magnetic tape were set to 100±10 μm, while the height R of the distal end of the head chip was set to 8 mm. In Tables 1 and 2, abrasion characteristics of a magnetic core surface were checked for various values of the angle θ between the <100> crystal orientations 9A, 9B on the magnetic core surface and the abutment surfaces M of the magnetic gap.

As may be seen from Tables 1 and 2, if the crystal planes are arranged so that the angle θ in the magnetic core 1 on the inlet side in the running direction of the magnetic recording medium (W core θ) and the angle θ in the magnetic core 1 on the outlet side in the same direction are such that $0° \leq \theta \leq 26°$ or $154° \leq \theta \leq 180°$, the amount of abrasion is decreased to 3.5 μm or less without regard to difference in the combinations of the values of the angle θ.

Moreover, the amount of R-top deviation is suppressed to 100 vm or less such that the abrasion characteristics are equal or even superior to those of the Comparative Example 1 having the crystal plane orientation of the β-type.

If the angle θ is deviated from the above range, there are still angle combinations which give good abrasion characteristics, such as those of the Comparative Examples 2, 13 or 14. However, these combinations are not practical because of unacceptable playback output or sliding noise.

Figure 6:
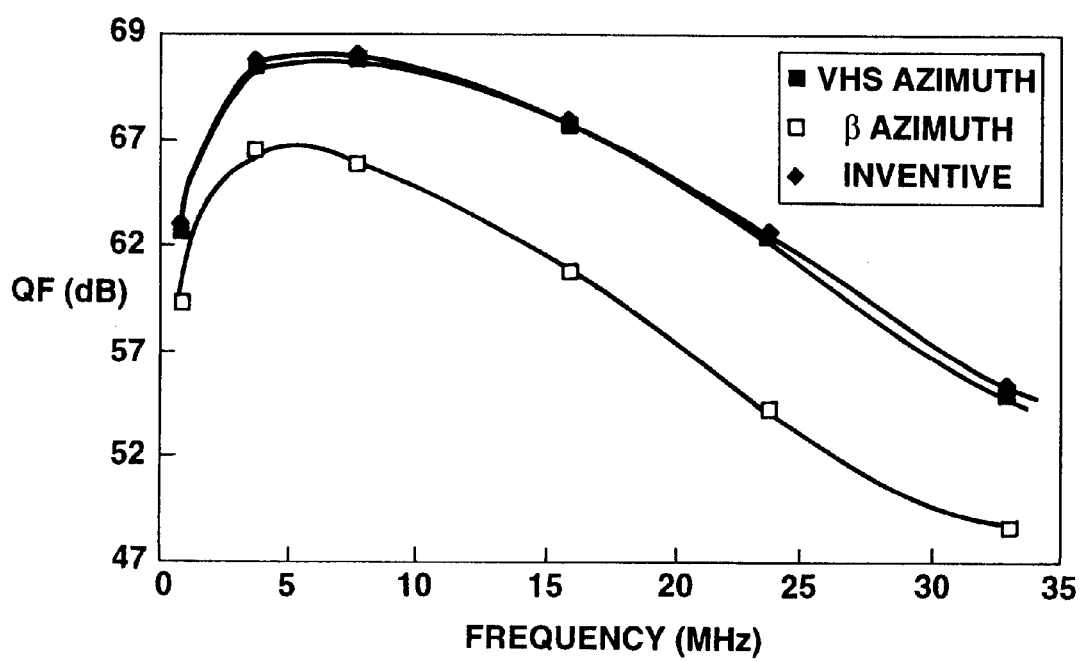
FIG. 6 is a graph showing characteristics of a magnetic head embodying the present invention with the crystal plane orientation of the conventional VHS format as compared to those with the crystal plane orientation of the β format.

FIG. 6 shows output characteristics of a magnetic head of the instant embodiment. Specifically, FIG. 6 shows, by way of comparison, a magnetic head of the instant embodiment, a magnetic head with the crystal plane orientation of the conventional VHS format and a magnetic head with the crystal plane orientation of the β-format. As may be seen from FIG. 4, the magnetic head of the instant embodiment makes best use of high output characteristics proper to the crystal plane orientation of the conventional VHS format.

What is claimed is:

1. A magnetic head having a pair of magnetic cores which are joined together to form a unified magnetic core and between abutment surfaces of which is formed a magnetic gap, characterized in that each of said paired magnetic cores has at least a portion thereof formed of single-crystal ferrite and extending to a sliding surface for sliding against a magnetic recording medium;

a main magnetic path forming surface of the single-crystal ferrite perpendicular to said abutment surfaces being constituted by a (110) plane, the sliding surface of each single-crystal ferrite core portion is constituted by a (100) plane perpendicular to said abutment surfaces, and a <100> crystal orientation of each single-crystal ferrite core portion is tilted at a non-zero angle of 26° or less relative to a depth direction of said gap.

2. The magnetic head as claimed in claim 1 wherein the <100> crystal orientation of the single crystal ferrite in one of the paired magnetic cores is inclined in the same direction as that in the other magnetic core.

3. The magnetic head as claimed in claim 1 wherein the <100> crystal orientation of the single crystal ferrite in one of the paired magnetic cores is inclined in a different direction from that in the other magnetic core.

4. The magnetic head as claimed in claim 1 wherein the angle of inclination of the <100> crystal orientation of the single-crystal ferrite in one of the paired magnetic cores is approximately equal to that in the other magnetic core.

5. The magnetic head as claimed in claim 1 wherein the angle of inclination of the <100> crystal orientation of the single-crystal ferrite in one of the paired magnetic cores is different from that in the other magnetic core.

6. The magnetic head as claimed in claim 1 wherein each of the paired magnetic cores is formed only of single crystal ferrite.

7. The magnetic head as claimed in claim 1 wherein the portion of each of the paired magnetic cores lying towards the sliding surface for the magnetic recording medium is formed of single-crystal ferrite and wherein the opposite side portion thereof is formed of polycrystal ferrite, with the single crystal ferrite and the polycrystal ferrite forming a junction ferrite.

* * * * *